(12) United States Patent
Momose et al.

(10) Patent No.: US 6,554,891 B1
(45) Date of Patent: Apr. 29, 2003

(54) INK COMPOSITION AND METHOD FOR INKJET RECORDING USING THE SAME

(75) Inventors: Masayuki Momose, Nagano-Ken (JP); Hiroshi Ito, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/744,344

(22) PCT Filed: May 25, 2000

(86) PCT No.: PCT/JP00/03360
§ 371 (c)(1), (2), (4) Date: Jan. 23, 2001

(87) PCT Pub. No.: WO00/71628
PCT Pub. Date: Nov. 30, 2000

(30) Foreign Application Priority Data

| May 25, 1999 | (JP) | 1999-145023 |
| Sep. 8, 1999 | (JP) | 1999-254815 |

(51) Int. Cl.⁷ ............. C09W 11/00; C09C 1/44
(52) U.S. Cl. ............. 106/31.86; 106/31.89; 106/472; 106/473; 106/474; 106/475; 106/476; 106/477; 106/478
(58) Field of Search ............. 106/31.86, 31.89, 106/472, 473, 474, 475, 476, 477, 478

(56) References Cited

U.S. PATENT DOCUMENTS

| 5,609,671 | A | | 3/1997 | Nagasawa | 106/20 R |
| 5,746,818 | A | | 5/1998 | Yatake | 106/31.86 |
| 5,846,307 | A | * | 12/1998 | Nagasawa et al. | 106/31.65 |
| 5,879,439 | A | * | 3/1999 | Nagai et al. | 106/31.28 |
| 5,976,233 | A | * | 11/1999 | Osumi et al. | 106/31.75 |
| 6,004,389 | A | | 12/1999 | Yatake | 106/31.86 |
| 6,153,001 | A | * | 11/2000 | Suzuki et al. | 106/31.65 |
| 6,261,353 | B1 | * | 7/2001 | Doi et al. | 106/31.6 |
| 6,299,675 | B1 | * | 10/2001 | Ono et al. | 106/31.27 |
| 6,332,919 | B2 | * | 12/2001 | Osumi et al. | 106/31.6 |
| 6,387,168 | B1 | * | 5/2002 | Koitabashi et al. | 106/31.6 |
| 6,454,846 | B2 | * | 9/2002 | Yatake | 106/31.58 |
| 6,471,757 | B1 | * | 10/2002 | Koitabashi et al. | 106/31.28 |
| 2002/0069789 | A1 | * | 6/2002 | Katsuragi et al. | 106/31.27 |

FOREIGN PATENT DOCUMENTS

| EP | 879857 | 11/1998 | |
| EP | 913438 | 5/1999 | |
| EP | 969054 | 1/2000 | |
| JP | 64(1989)-6074 | 1/1989 | C09D/11/18 |
| JP | 64(1989)-31881 | 2/1989 | C09D/11/16 |
| JP | 08(1996)-3498 | 1/1996 | C09D/11/00 |
| JP | 08(1996)-41396 | 2/1996 | C09D/11/00 |
| JP | 10(1998)-95941 | 4/1998 | C09D/11/00 |
| JP | 10(1998)-110127 | 4/1998 | C09D/11/00 |
| JP | 10(1998)-120958 | 5/1998 | C09D/11/02 |
| JP | 11181340 | 7/1999 | |
| JP | 11181341 | 7/1999 | |

OTHER PUBLICATIONS

JPO Abstract 64(1989)–6074, Jan. 10, 1989.
JPO Abstract 64(1989)–31881, Feb. 2, 1989.
JPO Abstract 08(1996)–41396, Feb. 13, 1996.
JPO Abstract 10(1998)–110127, Apr. 28, 1998.
JPO Abstract 10(1998)–120958, May 12, 1998.
English Patent Abstract of Japan 1118140 A.
English Patent Abstract of Japan 11–181341 A.

\* cited by examiner

*Primary Examiner*—Mark L. Bell
*Assistant Examiner*—Veronica F. Faison

(57) ABSTRACT

An ink composition containing a surface-modified pigment is provided which can realize anti-clogging properties and images having high print density. The ink composition comprises at least a colorant, glycerin, a glycol compound, and water, the colorant being a surface-modified pigment dispersible and/or dissolvable in water without any dispersant, the glycerin being contained in an amount of 3 to 30% by weight based on the ink composition, the glycol compound being contained in an amount of 1 to 20% by weight based on the ink composition and having a molecular weight of 130 to 3,000.

19 Claims, No Drawings

INK COMPOSITION AND METHOD FOR INKJET RECORDING USING THE SAME

BACKGROUND OF THE INVENTION

1. Field of the Invention

The present invention relates to an ink composition containing a surface-modified pigment.

2. Background Art

Ink jet recording is a recording method wherein droplets of ink are ejected through fine nozzles to form letters or figures on recording media. Various properties are required of inks used in such ink jet recording, and examples thereof include good storage stability, ejection stability, and rubbing/scratch resistance of prints.

An ink compositions is an aqueous solution which dissolves various water-soluble dyes. Further, inks in which pigments dispersed have also been provided. The ink composition comprising pigments dispersed in aqueous media are advantageously superior to ink compositions containing water-soluble dyes in waterfastness and lightfastness of printed images.

On the other hand, inks for ink jet recording are required to satisfy property requirements such that properties remain unchanged during storage for a long period of time, the storage stability is excellent (for example, the pigment can be stably kept in the state of dispersion for a long period of time), the ink does not clog fine nozzles, and prints yielded by the inks have excellent waterfastness and lightfastness. In particular, it is necessary for pigment-based inks to be realized high print density and high sharpness of prints and to free from nozzle clogging during printing or at the time of re-starting after interruption of printing. Japanese Patent Laid-Open Nos. 6074/1989 and 31881/1989 propose waterbase pigment inks wherein carbon black has been dispersed with the aid of a surfactant or a polymeric dispersant. In these inks, however, increasing the content of a pigment as the colorant in the ink to enhance the print density of records has resulted in increased viscosity of the ink which disadvantageously deteriorates the anti-clogging properties. Further, a surfactant or a polymeric dispersant is necessary to improve the dispersion stability of the pigment. The addition of an excessive amount of the surfactant and the polymeric dispersant, however, is causative of the occurrence of bubbles or deteriorated antifoaming properties. For this reason, the use of such inks for ink jet recording often adversely affects printing stability.

In order to reduce drying of an ink using a dispersant and a pigment within fine nozzles, Japanese Patent Laid-Open No. 41396/1996 proposes a method wherein glycerin and propylene glycol are added in respective proper amounts. This method, however, is not satisfactory for meeting the requirement for anti-clogging properties in ink jet recording.

On the other hand, an attempt has been made to improve the dispersion stability of pigments in ink without using any dispersant. For example, Japanese Patent Laid-Open Nos. 3498/1996 and 120958/1998 propose inks using a surface-modified carbon black which has introduced surface active hydrogen or a salt thereof in a given amount or larger into the surface of carbon black. This carbon black can be dispersed without the aid of a surfactant or a polymeric dispersant. Further, Japanese Patent Laid-Open No. 110127/1998 describes a method for introducing sulfone groups into carbon black, and Japanese Patent Laid-Open No. 95941/1998 proposes an ink for ink jet recording, comprising the above surface-modified carbon black and a glycol ether.

SUMMARY OF THE INVENTION

The present inventors have now found that an ink composition, comprises a surface-modified pigment, a specific amount of glycerin and a specific amount of a glycol compound having a specific molecular weight can realize good printed images and, particularly when used in ink jet recording, has excellent anti-clogging properties and can realize images having high print density. The present invention has been made based on such finding.

Accordingly, it is an object of the present invention to provide an ink composition which has excellent anti-clogging properties and can realize images having high print density, especially an ink composition which is best suited for use in ink jet recording.

Thus, according to the present invention, there is provided an ink composition comprising at least a colorant, glycerin, a glycol compound, and water, the colorant being a surface-modified pigment dispersible and/or dissolvable in water without any dispersant, the glycerin being contained in an amount of 3 to 30% by weight based on the ink composition, the glycol compound being contained in an amount of 1 to 20% by weight based on the ink composition and having a molecular weight of 130 to 3,000.

DETAILED DESCRIPTION OF THE INVENTION

Ink Composition

The ink composition according to the present invention is used in recording methods using ink compositions, for example, ink jet recording, recording method using writing utensils, such as pens, and other various printing methods. Particularly preferably, the ink composition according to the present invention is used in the ink jet recording method.

The ink composition according to the present invention comprises at least a colorant, glycerin,; a glycol compound, and water.

a) Colorant

The ink composition according to the present invention contains a colorant. According to the present invention, the colorant is a pigment which has been rendered dispersible and/or dissolvable in water without a surfactant or a dispersant, such as a water-soluble resin, and is generally called "self-dispersible pigment."

In the present invention, when the pigment is stably present in water without any dispersant, this state is expressed as the state of "dispersion and/or dissolution." Not infrequently, it is difficult to clearly distinguish the state of dissolution of a material from the state of dispersion of the material. In the present invention, any pigment can be used so far as the pigment can stably exist in water without any dispersant, independently of whether the pigment is in a dispersion form or a solution form. Therefore, in the present specification, a pigment, which can stably exist in water without any dispersant, is sometimes referred to as a "colorant." The pigment in this case, however, does not exclude a pigment which is in the state of dispersion.

The modification of the surface of the pigment to render the pigment "dispersible and/or dissolvable" may be carried out by directly bonding at least one hydrophilic functional group selected from the group consisting of, for example, carboxyl, carbonyl, hydroxyl, sulfone, and phosphoric acid groups and quaternary ammonium, or a salt thereof, onto the surface of the pigment. According to the present invention, the surface modification may be carried out by bonding at least one hydrophilic functional group, selected from the group consisting of carboxyl, carbonyl, hydroxyl, sulfone, and phosphoric acid groups and quaternary ammonium, or a salt thereof, onto the surface of the pigment through at least one group selected from the group consisting of alkyl, alkyl ether, and aryl groups.

More specifically, this surface-modified carbon black may be prepared by grafting a functional group or a molecule containing a functional group onto the surface of carbon black by physical treatment, such as vacuum plasma, or chemical treatment (for example, oxidation with hypochlorous acid, sulfonic acid or the like). The surface-modified carbon black may also be obtained by oxidizing the surface of a pigment with an oxidizing agent in water to introduce carboxyl or sulfone groups, or by bonding p-aminobenzoic acid or the like to the pigment to introduce carboxyl groups through a phenyl group. In the present invention, a single type or a plurality of types of functional groups may be grafted onto one pigment particle. The type of the functional group to be grafted and the degree of grafting may be suitably determined by taking into consideration the dispersion stability in the ink, the color density, the drying property at the front face of the ink jet head and the like.

According to the present invention, the surface-modified pigment is preferably one produced by a method involving wet oxidation with a hypohalous acid or a salt thereof. Hypohalous acids or salts thereof include sodium hypochlorite, potassium hypochlorite, sodium hypobromite, and potassium hypobromite. Among them, sodium hypochlorite is particularly preferred from the viewpoints of reactivity and cost.

Specifically, the method involving wet oxidation with a hypohalous acid or a salt thereof may be carried out as follows.

A pigment and a surface modifier (for example, sodium hypochlorite) are heated and dispersed or stirred in a suitable amount of water. For example, a ball mill, an attritor, a colloid mill, or a sand mill with glass, zirconia, alumina, stainless steel, magnetic or other beads added thereto may be used for stirring. In this case, preferably, the pigment may be previously ground. Alternatively, the pigment may be reacted with the surface modifier while grinding the pigment. In the case of carbon black, the grinding may be carried out by means of a rotary homogenizer or an ultrasonic homogenizer. Beads and coarse particles are separated from the dispersion after stirring and oxidation, followed by the removal of by-products of the oxidizing agent to perform purification. Thus, an aqueous pigment dispersion is obtained. If necessary, for example, concentration by a separation membrane or the like, filtration through a metallic filter or a membrane filter, classification by centrifugation, or neutralization with a hydroxide of an alkali metal salt or an amine may be carried out.

According to the present invention, the use of a surface-modified pigment produced, for example, by a method described in Japanese Patent Laid-Open No. 3498/1996 is preferred. The modified carbon black produced by the method described in the above publication has a high surface active hydrogen content of 1.5 to 2.5 mmol/g. As a result, the dispersibility of the modified carbon black in water is very high. Commercially available products may be used as the above pigment, and preferred examples thereof include Microjet CW 1 manufactured by Orient Chemical Industries, Ltd.

According to the present invention, preferred color surface-modified pigments include, for example, those produced by methods disclosed in Japanese Patent Laid-Open Nos. 189739/1999 and 110110/1998.

Inorganic or organic pigments may be used as the colorant without particular limitation. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigment), nitro pigments, nitroso pigments, and aniline black.

According to a preferred embodiment of the present invention, pigments other than such pigments as the above-described carbon black and Pigment Yellow, Pigment Red, Pigment Violet, Pigment Blue, and Pigment Black which are described in color index may also be used. Specific examples thereof include phthalocyanine, azo, anthraquinone, azomethine, and fused ring pigments. Preferred examples of additional pigments usable herein include: organic pigments, such as Yellow Nos. 4, 5, 205, and 401, orange No. 204, Red Nos. 104, 201, 202, 204, 220, 226 to 228, and 405, Blue Nos. 1 and 404; and inorganic pigments, such as titanium oxide, zinc oxide, zirconium oxide, iron oxide, ultramarine blue, iron blue, and chromium oxide. Among them, carbon black is preferred.

Carbon blacks usable for black inks include carbon blacks manufactured by Mitsubishi Chemical Corporation, for example, No. 2300, No. 900, MCF88, No. 33, No. 40, No. 45, No.52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Pigments for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Pigments for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57: 1, C.I. Pigment Red 112, C.I. Pigment Red 122, C.I. Pigment Red 123, C.I. Pigment Red 168, C.I. Pigment Red 184, and C.I. Pigment Red 202.

Pigments for cyan inks include C.I. Pigment Blue 1, C.I. Pigment Blue 2, C.I. Pigment Blue 3, C.I. Pigment Blue 15 : 3, C.I. Pigment Blue 15: 4, C.I. Pigment Blue 15 : 34, C.I.

Pigment Blue 16, C.I. Pigment Blue 22, C.I. Pigment Blue 60, C.I. Vat Blue 4, and C.I. Vat Blue 60.

According to a preferred embodiment of the present invention, the pigment has an average particle diameter of about 1 to 300 nm, more preferably about 10 to 200 nm. The content of the colorant is about 1 to 15% by weight, preferably about 2 to 12% by weight, based on the ink composition.

b) Glycerin

The ink composition according to the present invention contains glycerin. The content of glycerin is about 3 to 30% by weight, preferably about 5 to 15% by weight, based on the ink composition. When the glycerin falls within this content range, clogging of the recording head by the ink composition can be advantageously prevented.

c) Glycol Compound

The ink composition according to the present invention contains a glycol compound. According to the present invention, the ink composition containing glycerin and a glycol compound in combination, as compared with an ink composition wherein any one of glycerin and the glycol compound is solely contained, can realize a higher capability of providing suitable viscosity, higher print density, and better anti-clogging properties.

According to the present invention, the content of the glycol compound is about 1 to 30% by weight, preferably about 1 to 20% by weight, based on the ink composition. Further, according to the present invention, the molecular weight of the glycol compound is about 130 to 3,000, preferably about 170 to 2,500.

An example of a preferred glycol compound according to the present invention is a compound having in its molecule two hydroxyl groups and a glycol skeleton. Specific examples thereof include triethylene glycol, tetraethylene glycol, and dipropylene glycol. They may be used alone or as a mixture of two or more.

The glycol compound according to the present invention is preferably a polyalkylene glycol compound. The polyalkylene glycol compound is a linear polymeric compound having in its backbone a structure of repeated ether bonds, and may be produced, for example, by ring-opening polymerization of a cyclic ether. The polyalkylene glycol compound, when used in combination with the above colorant, can suppress feathering or bleeding of records and the like and can improve image quality of records.

Specific examples of polyalkylene glycol compounds include homopolymers, such as polyethylene glycol and polypropylene glycol, copolymers, such as ethylene oxide-propylene oxide copolymer, and derivatives thereof. Any of random, block, graft, and alternating copolymers may be used.

Specific examples of such polyalkylene glycol compounds may be represented by formula (I):

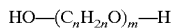

$$HO—(C_nH_{2n}O)_m—H \quad (I)$$

wherein n is an integer of 1 to 5; and m is an integer of 1 to 100.

In the above formula, the integer n in $(C_nH_{2n}O)_m$ may be one constant or a combination of two or more numbers in the above defined range. For example, when n is 3, $(C_nH_{2n}O)_m$ is $(C_3H_6O)_m$; and when n is a combination of 1 and 4, $(C_nH_{2n}O)_m$ is $(CH_2—C_4H_8O)_m$. The integer m may be one constant or a combination of two or more numbers in the above defined range. For example, in the above example of n, when m is a combination of 20 and 40, $(C_nH_{2n}O)_m$ is $(CH_2O)_{20}—(C_2H_4O)_{40}$. When m is a combination of 10 and 30, $(C_nH_{2n}O)_m$ is $(CH_2O)_{10}—(C_4H_8O)_{30}$. Further, the integers n and m may be in any combination so far as n and m are respectively in the above defined ranges. Therefore, the polyalkylene glycol compound according to the present invention can constitute the above copolymer by combining n and m.

The polyalkylene glycol compound may be produced by a conventional process or alternatively may be a commercially available product.

According to a preferred embodiment of the present invention, the glycol compound is one compound or a mixture of two or more of compounds selected from the group consisting of triethylene glycol, tetraethylene glycol, dipropylene glycol, polyethylene glycol, polypropylene glycol, and oxyethylene-oxypropylene copolymer.

d) Water, Water-soluble Organic Solvent, and Other Optional Ingredients

The ink composition according to the present invention comprises water as a main solvent. If necessary, a water-soluble organic solvent and other optional ingredients may also be contained.

Examples of water-soluble organic solvents usable herein include: lower alcohols, such as ethanol and propanol; cellosolves, such as ethylene glycol monomethyl ether and ethylene glycol monoethyl ether; and carbitols, such as diethylene glycol monomethyl ether and diethylene glycol monoethyl ether.

According to the present invention, the water-soluble organic solvent may be a surfactant. Specific examples of surfactants usable herein include anionic surfactants, such as fatty acid salts and alkylsulfuric acid ester salts, nonionic surfactants, such as polyoxyethylene alkyl ethers and polyoxyethylene phenyl ether, cationic surfactants, and amphoteric surfactants. The surfactant serves as a penetrant in the ink composition according to the present invention.

The surface-modified pigment according to the present invention is a colorant which is dispersible and/or dissolvable in water without the aid of any surfactant as a dispersant. Therefore, in the ink composition according to the present invention, the surfactant may be used only for accelerating the penetration of the ink. Specifically, in general, in order to impart dispersibility to a pigment, regarding the surfactant, selection of a combination should be done so that the pigment and the surfactant are adsorbed on each other. By contrast, according to the present invention, the surfactant can be selected by taking into consideration only the penetration acceleration effect without the need to take the above combination into consideration.

The water-soluble organic solvents or surfactants may be used alone or in combination of two or more as the penetrant. When the addition of the surfactant to the ink composition is contemplated, it is desired that the surfactant be added so as to regulate the surface tension of the ink composition to not more than 40 mN/m, preferably not more than 35 mN/m.

Among the above surfactants, nonionic surfactants, such as polyoxyethylene alkyl ethers and polyoxyethylene phenyl ethers, are preferred. Specific examples of such nonionic surfactants include Nissan Nonion K-211, K-220, P-213, E-215, E-220, S-215, S-220, HS-220, NS-212, and NS-220 (tradenames; manufactured by Nippon Oils & Fats Co., Ltd.). Among the nonionic surfactants, acetylene glycol surfactants, such as Surfynol 61, 82, 104, 440, 465, and 485 (tradenames; manufactured by Air Products and Chemicals, Inc.), are particularly preferred.

According to the present invention, the water-soluble organic solvents and surfactants described above may be used as the penetrant. Among them, a glycol ether water-soluble organic solvent is more preferred. Glycol ether water-soluble organic solvents include alkyl (preferably having 1 to 6 carbon atoms) ethers of polyhydric alcohols. Specific examples thereof include ethylene glycol mono-n-butyl ether, diethylene glycol n-butyl ether, and triethylene glycol n-butyl ether. The combination of the organic solvent with the surface-modified pigment can reduce feathering or bleeding of records.

A water-soluble compound may be further added to the ink composition according to the present invention to further improve stability in recording, such as writing properties and ejection properties. The addition of suitable water-soluble compounds can provide more smooth writing free from blurring and the like in the case of writing utensils, such as pens, and can provide more stable ejection in the case of ink jet recording.

Organic solvents and water-soluble solids commonly used in ink compositions may be used as the water-soluble compound. Specific examples thereof include: polyols, such as 1,3-propanediol, 1,4-butanediol, 1,5-pentanediol, 1,6-hexanediol, 1,2,6-hexanetriol, and pentaerythritol; lactams, such as 2-pyrrolidone, N-methyl-2-pyrrolidone, and ε-caprolactam; ureas, such as urea, thiourea, ethyleneurea, and 1,3-dimethylimidazolidinones; and saccharides, such as maltitol, sorbitol, gluconic lactone, and maltose.

If necessary, the ink composition according to the present invention may further contain pH adjustors, antioxidants and ultraviolet absorbers, preservatives and antimold and the like.

Specific examples of pH adjustors usable herein include hydroxides of alkali metals or amines, such as lithium hydroxide, sodium hydroxide, potassium hydroxide, triethanolamine, and diethanolamine.

Specific examples of antioxidants and ultraviolet absorbers include: allophanates, such as allophanate and methyl allophanate; biurets, such as biuret, dimethylbiuret, and tetramethylbiuret; L-ascorbic acid and salts thereof; and Tinuvin 328, 900, 1130, 384, 292, 123, 144, 622, 770, and 292, Irgacor 252 and 153, and Irganox 1010, 1076, 1035, and MD 1024, manufactured by Ciba-Geigy; and lanthanide oxides.

Specific examples of preservatives and antimold include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI).

Water-soluble resins may be added to the ink composition according to the present invention from the viewpoint of further improving the fixation of records.

Specific examples of water-soluble resins usable herein include water-soluble rosins, alginic acids, polyvinyl alcohol, hydroxypropylcellulose, carboxymethylcellulose, hydroxyethylcellulose, methylcellulose, styrene/acrylic acid resin, styrene/acrylic acid/acrylic ester resin, styrene/maleic acid resin, styrene/maleic acid semi-ester resin, acrylic acid/acrylic ester resin, isobutylene/maleic acid resin, rosin-modified maleic acid resin, polyvinylpyrrolidone, gum arabic, starch, polyallylamine, polyvinylamine, and polyethyleneimine.

The colorant according to the present invention is a surface-modified pigment which is dispersible and/or dissolvable in water without the aid of a dispersant composed of a water-soluble resin. Therefore, the water-soluble resin used in the ink composition according to the present invention can be used for fixation purposes only. That is, according to the present invention, a water-soluble resin may be selected as a fixing agent rather than as the dispersant for the pigment.

The ink composition according to the present invention is preferably regulated to a viscosity in the range of 1.0 to 25 mPa.s. When the viscosity of the ink falls within the above range, the ink composition, when used in ink for ink jet recording, can be stably ejected. The ink composition according to the present invention has a surface tension of about 25 to 50 mN/m, preferably about 30 to 40 mN/m.

The ink composition according to the present invention preferably has a penetrability such that, when the coverage of the ink composition is 1 mg/cm$^2$, the penetration time of the ink composition is less than 1 second. More specifically, the expression "a penetrability such that, when the coverage of the ink composition is 1 mg/cm$^2$, the penetration time of the ink is less than 1 second" means that, for example, when 50 ng of the ink composition is coated onto a plain paper in an area of 360 dpi (dots/inch)×360 dpi, the time necessary for the print face to dry to touch is less than one sec. In this case, a neutral plain paper, for example, Xerox P (tradename; manufactured by Fuji Xerox Co., Ltd.), is used as the plain paper. Ink compositions satisfying this requirement are such that a water-soluble organic solvent having a capability of reducing the surface tension of an aqueous solution or a surfactant as a penetrant has been added to improve the ability of the ink composition to wet the recording medium, thereby improving the penetration speed of the ink composition into the recording medium.

Production Process of Ink Composition

The pigment is mixed with the surface modifier by the above method to prepare an aqueous pigment dispersion. Water, a water-soluble organic solvent, a saccharide, a pH adjustor, a preservative, an antimold and the like are then added to and thoroughly dissolved in the aqueous pigment dispersion to prepare an ink solution. After thorough stirring, the ink solution is filtered to remove coarse particles and foreign matter causative of nozzle clogging to prepare a contemplated ink composition.

Ink Jet Recording Method

The ink composition according to the present invention may be preferably used in ink jet recording. In the ink jet recording method according to the present invention, any method may be used so far as the ink composition is ejected, through fine nozzles, as droplets which are then deposited onto a recording medium. Methods usable herein will be described.

A first method is a static electricity-driven ejection method. In this method, a strong electric field is applied between nozzles and accelerating electrodes disposed in the front of the nozzles to continuously eject the ink as droplets through nozzles. During a period in which, upon ejection, the ink droplets reside between the deflecting electrodes, a printing information signal is sent to the deflecting electrodes to perform recording. Alternatively, in this method, ejection may be carried out in response to the print information signal without deflecting the ink droplets.

A second method is such that a pressure is applied to an ink composition by means of a miniature pump, and nozzles are mechanically vibrated by means of a quartz oscillator or the like to forcibly eject ink droplets. According to this embodiment, at the same time that the ink droplets are ejected, the ink droplets are electrified, and during a period in which, upon ejection, the ink droplets reside between the deflecting electrodes, a printing information signal is sent to the deflecting electrodes to perform recording.

A third method is such that a piezoelectric element is used. In this method, a pressure and a printing information signal are simultaneously applied to an ink composition by means of a piezoelectric element to eject ink droplets, thereby performing recording.

A fourth method is such that the volume of the ink composition is rapidly increased through the action of thermal energy. In this case, bubbles of the ink composition are thermally formed in response to a printing information signal by means of microelectrodes to eject ink droplets, thereby performing recording.

Ink Jet Recording Apparatus

The ink jet recording apparatus according to the present invention is one for ejecting droplets of an ink composition and depositing the droplets onto a recording medium to perform recording, wherein at least the ink composition having the above constitution is used as the ink composition. According to the present invention, the recording apparatus may adopt any of the above ink jet recording methods.

EXAMPLES

The following examples further illustrate the present invention, but are not construed as limiting the scope of the present invention.

Preparation of Black Pigment Dispersions
Pigment Dispersion A

An acidic carbon black (100 g) having a primary particle diameter of 24 nm and a specific surface area of 137 $m^2/g$ was mixed with 500 g of water. The mixture was ball milled using zirconia beads. Sodium hypochlorite (available chlorine content 12%) (1,500 g) was added dropwise to the resultant milled stock liquid, and the mixture was boiled for 10 hr to conduct wet oxidation. The resultant stock dispersion was filtered through a glass fiber filter paper GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion A.

Pigment Dispersion B

An acidic carbon black (100 g) having a primary particle diameter of 17 nm and a specific surface area of 200 $m^2/g$ was mixed with 1 kg of water. The mixture was ball milled using zirconia beads. Sodium hypochlorite (available chlorine content 12%) (1,400 g) was added dropwise to the resultant milled stock liquid. A reaction was allowed to proceed while ball milling for 5 hr, followed by boiling for 4 hr with stirring to conduct wet oxidation. The resultant stock dispersion was filtered through a glass fiber filter paper GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion B.

Pigment Dispersion C

Carbon black (100 g) as used in the preparation of the pigment dispersion A, 150 g of Joncryl J-62 (tradename; manufactured by Johnson Polymer Corp.) as a dispersant for a water-soluble resin, 6 g of sodium hydroxide, and 250 g of water were mixed together. The mixture was dispersed by means of a ball mill using zirconia beads for 10 hr. The stock dispersion thus obtained was filtered through a stainless steel filter having a pore diameter of about 5 $\mu$m, followed by dilution with water to a pigment concentration of 10% by weight to prepare an aqueous pigment dispersion C with the pigment being dispersed with the aid of a water-soluble resin.

Preparation of Color Pigment Dispersions
Yellow Pigment Dispersion D

A commercially available organic pigment IRGAZINDPP Red BO (tradename; manufactured by Ciba-Geigy Limited) was thoroughly mixed in an amount of 300 g with 1 kg of water. The mixture was then dispersed in a horizontal sand mill for 5 hr. Sodium hypochlorite (available chlorine content 12%) (450 g) was added dropwise to the dispersion, and the mixture was stirred at 50 to 60° C. for 15 hr. The resultant slurry was filtered through Filter Paper No. 2 (manufactured by Advantec Toyo Kaisha Ltd.), followed by washing with water until pigment particles were passed through the filter paper. The pigment wet cake thus obtained was redispersed in 3 kg of water. The dispersion was desalted through a reverse osmosis membrane to an electrical conductivity of 70 $\mu$S. Further, this pigment dispersion was concentrated to a pigment concentration of 10% by weight. Thus, an aqueous pigment dispersion D was prepared.

Magenta Pigment Dispersion E

A commercially available organic pigment Cinquasia Red B RT-790D (tradename; manufactured by Ciba-Geigy Limited) was thoroughly mixed in an amount of 300 g with 1 kg of water. The mixture was then dispersed in a horizontal sand mill for 5 hr. Sodium hypochlorite (available chlorine content 12%) (450 g) was added dropwise to the dispersion, and the mixture was stirred at 50 to 60° C. for 15 hr. The resultant slurry was filtered through Filter Paper No. 2 (manufactured by Advantec Toyo Kaisha Ltd.), followed by washing with water until pigment particles were passed through the filter paper. The pigment wet cake thus obtained was redispersed in 3 kg of water. The dispersion was desalted through a reverse osmosis membrane to an electrical conductivity of 70 $\mu$S. Further, this pigment dispersion was concentrated to a pigment concentration of 10% by weight. Thus, an aqueous pigment dispersion E was prepared.

Cyan Pigment Dispersion F

A commercially available organic pigment Cyanine Blue BNRS (tradename; manufactured by Toyo Ink Manufacturing Co., Ltd.) was thoroughly mixed in an amount of 300 g with 1 kg of water. The mixture was then dispersed in a horizontal sand mill for 5 hr. Sodium hypochlorite (available chlorine content 12%) (1,000 g) was added dropwise to the dispersion, and the mixture was stirred at 10 to 20° C. for 12 hr. The resultant slurry was filtered through Filter Paper No. 2 (manufactured by Advantec Toyo Kaisha Ltd.), followed by washing with water until pigment particles were passed through the filter paper. The pigment wet cake thus obtained was redispersed in 3 kg of water. The dispersion was desalted through a reverse osmosis membrane to an electrical conductivity of 70 $\mu$S. Further, this pigment dispersion was concentrated to a pigment concentration of 10% by weight. Thus, an aqueous pigment dispersion F was prepared.

Preparation of Ink Compositions

The following ingredients were mixed together according to the following formulations. Ultrapure water was added to the mixtures to bring the total amount of the mixture to 100 g. The mixed solutions were then adjusted to pH 7.5 by the addition of triethanolamine. The mixed solutions were stirred at 25° C. for 2 hr. and then filtered through a stainless steel filter having a pore diameter of about 5 μm. Thus, water-base ink compositions of Examples U1 to U4, Examples W1 to W4, Examples Y1 to Y3, Comparative Examples U1 to U5, Comparative Examples V1 and V2, Comparative Examples W1 to W5, Comparative Examples X1 and X2, Comparative Examples Y1 to Y4, and Comparative Example Z1 were prepared.

|  | Pigment dispersion | Glycerin | Glycol compound | Others |
|---|---|---|---|---|
| Example U1 | A 45 g | 6 g | DPrG 4 g | PeOH 4 g |
| Example U2 | B 45 g | 8 g | TeEG 8 g | EtOH 4 g |
| Example U3 | B 45 g | 10 g | TeEG 5 g | DEGmBE 7.5 g |
| Example U4 | A 45 g | 12 g | DPrG 5 g | TEGmBE 5 g S465 0.6 g |
| Comparative Example U1 | A 45 g | 6 g | — | DEGmBE 7.5 g |
| Comparative Example U2 | A 45 g | — | DPrG 9 g | PeOH 4 g |
| Comparative Example U3 | B 45 g | 35 g | TeEG 10 g | TEGmBE 5 g |
| Comparative Example U4 | B 45 g | 10 g | TeEG 25 g | PeOH 4 g |
| Comparative Example U5 | C 45 g | 6 g | TeEG 3 g | EtOH 4 g |
| Comparative Example V1 | A 45 g | — | DPrG 5 g | EG 10 g PeOH 4 g |
| Comparative Example V2 | B 45 g | 6 g | — | EG 4 g EtOH 4 g |
| Example W1 | A 45 g | 6 g | PEG400 4 g | PeOH 4 g |
| Example W2 | B 45 g | 8 g | PPrG400 3 g | EtOH 4 g |
| Example W3 | B 45 g | 10 g | PEPrG 3 g | DEGmBE 7.5 g |
| Example W4 | A 45 g | 12 g | PEG400 4 g | TEGmBE 5 g S465 0.6 g |
| Comparative Example W1 | A 45 g | 6 g | — | DEGmBE 7.5 g |
| Comparative Example W2 | A 45 g | — | PEG400 4 g | PeOH 4 g |
| Comparative Example W3 | B 45 g | 35 g | PPrG400 5 g | TEGmBE 5 g |
| Comparative Example W4 | B 45 g | 10 g | PPrG400 30 g | PeOH 4 g |
| Comparative Example W5 | C 45 g | 6 g | PEG400 4 g | EtOH 4 g |
| Comparative Example X1 | A 45 g | — | PPrG400 30 g | EG 10 g PeOH 4 g |
| Comparative Example X2 | B 45 g | 6 g | PEG3500 6 g | EtOH 4 g |
| Example Y1 | D 45 g | 6 g | DPrG 4 g | PeOH 4 g |
| Example Y2 | E 45 g | 12 g | TeEG 5 g | TEGmBE 5 g |
| Example Y3 | F 45 g | 8 g | PPrG400 3 g | EtOH 4 g |
| Comparative Example Y1 | D 45 g | 6 g | — | DEGmBE 7.5 g |
| Comparative Example Y2 | E 45 g | — | DPrG 9 g | PeOH 4 g |
| Comparative Example Y3 | F 45 g | 35 g | TeEG 10 g | TEGmBE 4 g |
| Comparative Example Y4 | D 45 g | 10 g | PEG400 25 g | PeOH 4 g |
| Comparative Example Z1 | E 45 g | — | DPrG 5 g | EG 10 g PeOH 4 g |

In the formulation, abbreviations respectively represent the following compounds.

DPrG . . . Dipropylene glycol
TeEG . . . Tetraethylene glycol
EG . . . Ethylene glycol
PEG 400 . . . Polyethylene glycol (average molecular weight 400)
PEG 3500 . . . Polyethylene glycol (average molecular weight 3,500)
PPrG 400 . . . Polypropylene glycol (average molecular weight 400)
PEPrG . . . Oxyethylene oxypropylene block copolymer (average molecular weight 500)
PeOH . . . tert-Pentanol
EtOH . . . Ethanol
DEGmBE . . . Diethylene glycol mono-n-butyl ether
TEGmBE . . . Triethylene glycol mono-n-butyl ether
S 465 . . . Surfynol 465

Tests on Evaluation of Inks

Evaluation 1: Print Density

The ink compositions prepared in the examples and the comparative examples were evaluated for print density as follows.

Each ink composition was loaded into a piezoelectric on-demand ink jet recording apparatus MJ-930C (tradename; manufactured by Seiko Epson Corporation). With this printer MJ-930C, printing was conducted on a neutral plain paper Xerox P (tradename; manufactured by Fuji Xerox Co., Ltd.) as a recording medium to obtain records.

The ink compositions of Comparative Examples U3, W3, and Y3 having a glycerin content of more than 30% by weight, the ink compositions of Comparative Examples U4, W4, and Y4 having a glycol compound content of more than 20% by weight and a glycerin content of 10% by weight, and the ink composition of Comparative Example X2 wherein the molecular weight of the glycol compound was more than 3,000, however, could not be stably ejected due to their high viscosity, and thus could not provide records. After drying the records, the print density was measured with a Macbeth densitometer TR-927 (tradename; manufactured by Kollmorgen Corporation). The results were as summarized in Table 1.

As is apparent from Table 1, the water-base ink compositions of the examples according to the present invention had higher print density than the water-base ink compositions of Comparative Examples U1, W1, and Y1 having a glycol compound content of less than 1% by weight and the water-base ink compositions of Comparative Examples U5 and W5 using a pigment dispersion produced by resin dispersion. That is, surface-modified pigment-containing water-base ink compositions having a glycol compound content of not less than 1% by weight could provide records having high print density.

Evaluation 2: Anti-clogging Properties

Each of the ink compositions prepared in the examples and the comparative examples were loaded into the ink jet recording apparatus MJ-930C, and printing was then performed. Thereafter, in the ink jet recording apparatus, the print head portion was removed from the home position, followed by standing in this state in an environment of 50° C. for 4 weeks. After the standing, the printing test was carried out again to examine whether or not the ink could be stably ejected. The anti-clogging properties were evaluated based on the results according to the following criteria. The results of evaluation were as summarized in Table 1.

A: Ejection after standing was stable.
B: Ejection after standing was unstable, requiring the repetition of cleaning operation of the head portion twice or less for stable ejection.
C: Ejection after standing was unstable, requiring the repetition of cleaning operation of the head portion five times or less for stable ejection.
D: Ejection after standing was unstable, and, even after the repetition of cleaning operation, ejection remained unstable.

As is apparent from Table 1, the water-base ink compositions of the examples according to the present invention had better anti-clogging properties than the water-base ink compositions of Comparative Examples U1, W1, and Y1 having a glycol compound content of less than 1% by weight, the water-base ink compositions of Comparative Examples U2, V1, W2, X2, Y2, and Z1 having a glycerin content of less than 3% by weight, and the water-base ink compositions of Comparative Examples U5 and W5 using a pigment dispersion produced by resin dispersion. That is, surface-modified pigment-containing water-base ink compositions having a glycerin content of not less than 3% by weight and a glycol compound content of not less than 1% by weight can ensure good anti-clogging properties.

Evaluation 3: Print Quality

Each of the ink compositions prepared in the examples and the comparative examples was loaded into the ink jet recording apparatus MJ-930C, and letters having a size of 10 points were printed on plain papers and recycled papers. In the evaluation, five types of papers in total were used: Xerox P and Xerox 4024 (tradenames; manufactured by Fuji Xerox Co., Ltd.) as neutral plain papers; EPP (tradename; manufactured by Seiko Epson Corp.) as an acidic plain paper; and Xerox R (tradename; manufactured by Fuji Xerox Co., Ltd.) and Yamayuri (tradename; manufactured by Honshu Paper Co., Ltd.) as recycled papers. The printed letters were visually inspected to evaluate the print quality based on the following criteria.

A: For all the evaluated papers, the print quality was good.

B: For only two or less papers among the evaluated papers, there was a deterioration in print quality.

C: For three or more papers among the evaluated papers, there was a deterioration in print quality.

D: For all the evaluated papers, there was a deterioration in print quality.

The results of evaluation were as summarized in Table 1.

As is apparent from Table 1, the water-base ink compositions of the examples according to the present invention provided better print quality than the water-base ink composition of Comparative Example V2 containing a glycol compound having a molecular weight of less than 130. The water-base ink compositions of Examples U2, U3, W1 to W4, and Y2 and Y3, wherein the molecular weight of the glycol compound was not less than 170, provided particularly good print quality. Surface-modified pigment-containing water-base ink compositions, wherein the molecular weight of the glycol compound was not less than 130, could provide records having good print quality. The water-base ink compositions of Examples U3, U4, W3, W4, and Y2, which additionally contained a glycol ether compound, provided particularly good print quality. Further, the water-base ink compositions of Examples U4, W4, and Y2, which additionally contained a nonionic surfactant, were much less likely to foam and were easy to handle.

TABLE 1

| Ink | Evaluation 1 | Evaluation 2 | Evaluation 3 |
| --- | --- | --- | --- |
| Example U1 | 1.55 | A | B |
| Example U2 | 1.53 | A | A |
| Example U3 | 1.49 | A | A |
| Example U4 | 1.48 | A | B |
| Comparative Example U1 | 1.32 | B | B |
| Comparative Example U2 | 1.51 | D | D |

TABLE 1-continued

| Ink | Evaluation 1 | Evaluation 2 | Evaluation 3 |
| --- | --- | --- | --- |
| Comparative Example U3 | — | — | — |
| Comparative Example U4 | — | — | — |
| Comparative Example U5 | 1.29 | D | C |
| Comparative Example V1 | 1.53 | D | B |
| Comparative Example V2 | 1.50 | A | D |
| Example W1 | 1.51 | A | A |
| Example W2 | 1.50 | A | A |
| Example W3 | 1.49 | A | A |
| Example W4 | 1.48 | A | A |
| Comparative Example W1 | 1.32 | B | B |
| Comparative Example W2 | 1.52 | D | B |
| Comparative Example W3 | — | — | — |
| Comparative Example W4 | — | — | — |
| Comparative Example W5 | 1.25 | D | B |
| Comparative Example X1 | 1.51 | D | B |
| Comparative Example X2 | — | — | — |
| Example Y1 | 1.35 | A | B |
| Example Y2 | 1.38 | A | A |
| Example Y3 | 1.41 | A | A |
| Comparative Example Y1 | 1.09 | B | B |
| Comparative Example Y2 | 1.37 | D | D |
| Comparative Example Y3 | — | — | — |
| Comparative Example Y4 | — | — | — |
| Comparative Example Z1 | 1.37 | D | C |

What is claimed is:

1. An ink composition comprising a colorant, glycerin, a glycol compound, and water, the colorant being a surface-modified pigment dispersible and/or dissolvable in water without any dispersant, the glycerin being present in an amount of 3 to 30% by weight based on the ink composition, the glycol compound being present in an amount of 1 to 20% by weight based on the ink composition and having a molecular weight of 170 to 2,500.

2. The ink composition according to claim 1, which contains 1 to 15% by weight, based on the ink composition, of the colorant.

3. The ink composition according to claim 1, wherein the colorant is a pigment obtained by modifying the surface to bond at least one hydrophilic functional group, selected from the group consisting of carboxyl, carbonyl, hydroxyl, sulfone, and phosphoric acid groups and quaternary ammonium, or a salt thereof, onto the surface of a pigment, whereby the pigment is dispersible and/or dissolvable in water without any dispersant.

4. The ink composition according to claim 3, wherein the surface modification has been carried out by bonding at least one hydrophilic functional group, selected from the group consisting of carboxyl, carbonyl, hydroxyl, sulfone, and phosphoric acid groups and quaternary ammonium, or a salt thereof, onto the surface of the pigment through at least one group selected from the group consisting of alkyl, alkyl ether, and aryl groups.

5. The ink composition according to claim 1, wherein said colorant is a surface-modified pigment obtained by wet oxidation of a pigment on its surface with a hypohalous acid or a salt thereof to modify the surface of the pigment, whereby the pigment has been rendered dispersible and/or dissolvable in water without any dispersant.

6. The ink composition according to claim 1, wherein the pigment is carbon black.

7. The ink composition according to claim 1, wherein the content of the glycerin is 5 to 15% by weight based on the ink composition.

8. The ink composition according to claim 1, wherein the content of the glycol compound is 1 to 20% by weight based on the ink composition.

9. The ink composition according to claim 1, wherein the glycol compound is a polyalkylene glycol compound.

10. The ink composition according to claim 1, wherein the glycol compound is at least one compound selected from the group consisting of triethylene glycol, tetraethylene glycol, dipropylene glycol, polyethylene glycol, polypropylene glycol, and oxyethylene-oxypropylene copolymer.

11. The ink composition according to claim 1, which contains an alkyl ether of a polyhydric alcohol.

12. The ink composition according to claim 11, wherein the alkyl group in the alkyl ether of the polyhydric alcohol has 1 to 6 carbon atoms.

13. The ink composition according to claim 1, which further contains a nonionic surfactant.

14. The ink composition according to claim 13, wherein the nonionic surfactant is an acetylene glycol surfactant.

15. The ink composition according to claim 1, which, when the coverage of the ink composition on a recording medium is 1 $mg/cm^2$, has a penetrability of less than 1 second in terms of the penetration time of the ink composition.

16. The ink composition according to claim 1, which, is used in an ink jet recording method.

17. A print produced by the recording method according to claim 16.

18. An ink jet recording apparatus for ejecting droplets of an ink composition and depositing the droplets onto a recording medium to perform recording, wherein at least the ink composition according to claim 1 is used as the ink composition.

19. A print produced by the recording apparatus according to claim 18.

* * * * *